July 28, 1964 W. G. PFANN 3,142,173
ELASTIC STRAIN TRANSDUCERS
Filed June 1, 1960
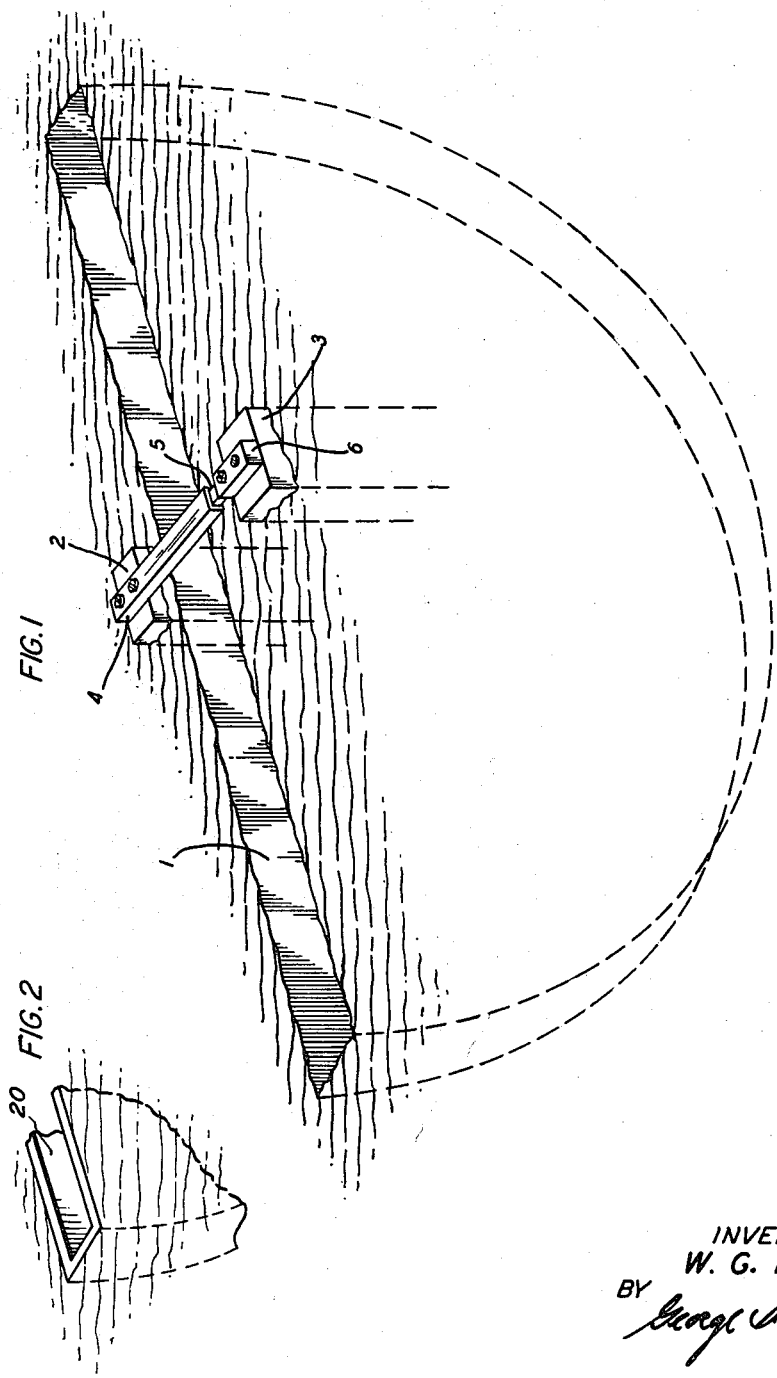
INVENTOR
W. G. PFANN
BY
ATTORNEY 3,142,173
ELASTIC STRAIN TRANSDUCERS
William G. Pfann, Far Hills, N.J., assignor to Bell Telephone Laboratories, Incorporated, New York, N.Y., a corporation of New York
Filed June 1, 1960, Ser. No. 33,225
7 Claims. (Cl. 73—88.5)

This invention relates to a method for measuring strains. Further it relates to an arrangement for measuring directional strains in elastic media, particularly seismic strains. More specifically the invention concerns a cavity having specified dimensional requirements designed so as to magnify strains appearing in the medium supporting the cavity.

Typical linear strain seismographs are discussed briefly by H. Benioff in "Advances in Geophysics," vol. 2, 1955, at pages 244 to 252. These devices detect linear directional earth movements using piers imbedded in the medium and spaced apart by large distances. The strain measured is magnified by an amount which is a linear function of the distance of separation. In order to achieve desired magnifications, these spacings may be of the order of tens of meters. A typical installation described by Benioff at pages 250 and 251 is 24 meters in length.

It has now been found that if a cavity of a specified nature is used to detect the strains in the medium, and the strain is measured across the proper dimension of the cavity according to the teachings of this invention, significantly greater strain magnifications result using the same maximum dimension.

Consider a cylindrical cavity having diameter D and height H. An axial stress $\epsilon_0$ in the elastic medium surrounding such a cavity produces a relative displacement $\Delta H$ between the centers of each end which is represented by $$\Delta H = \epsilon_0 H + 2\epsilon_0(1-\nu^2)D \qquad (1)$$

where $\nu$ is Poisson's ratio for the elastic medium.

The first term $\epsilon_0 H$ is the linear strain displacement dominating conventional devices of the prior art. The second term dictates the amount of displacement due to flexing or inward bowing of the circular end faces of the disk-shaped cavity. It is obvious that in long cylinders this term is of less consequence than the first term. However, as D is increased with respect to H, this second term becomes significant. It is also apparent that in this equation the value of Poisson's ratio is of consequence. If the cavity is in rock, the value is approximately .3. Structural steel has a Poisson's ratio of about .25. For typical materials, therefore, the second term of Equation 1 becomes at least about 1.8 $\epsilon_0 D$. It is seen that the flexing or bowing effect is significantly more sensitive to strains than is the linear strain factor appearing as the first term of Equation 1.

This bowing factor can be utilized in practice through the employment of a particular cavity which is formed or supported by the elastic medium in which strains are desired to be measured. For the purpose of this invention it is convenient to consider seismic strains in particular, although other modifications of the principle in various other media will be apparent to those skilled in the art.

The invention may be better understood when considered in conjunction with the drawing.

FIG. 1 is a schematic view of a typical cavity and strain detector according to the invention; and FIG. 2 is a schematic representation of a portion of a device constructed according to a further embodiment of the invention.

The cavity, indicated generally at 1, is of a thin semi-circular disk shape. In connection with the foregoing discussion, it may best be considered as a half cylinder in which the long dimension is the diameter and the short or "thin" dimension is the height of the "half" cylinder. The cavity is open at the top. The strain gauge which necessarily is located at or near the axis of the half cylinder (as that is where the deflection is a maximum) may be of any conventional prior art type. Typically, such gauges take the form of piers such as 2 and 3 imbedded on the medium with indicator 5 measuring the relative displacement of columns 4 and 6. Such gauges or deflection indicators are described in greater detail in the publication by Benioff supra.

In order to appreciate the increase in magnification afforded by this arrangement, compare the linear strain seismograph described by Benioff having a maximum dimension of 24 meters with a corresponding half cylinder having the same maximum dimension according to this invention. The Benioff linear strain seismograph would provide a relative displacement $\Delta H$ of the ends of the gauge which is represented by Equation 1:

$$\Delta H = H\epsilon_0 + 2(1-\nu^2)D\epsilon_0$$

since for seismic considerations $\nu = .3$ and assuming the values $H=24$ meters, $D=1$ meter, which are corresponding dimensions in the Benioff strain seismograph, then:

$$\Delta H \cong 24\epsilon_0 + 1.8\epsilon_0$$
$$\Delta H \cong 25.8\epsilon_0$$

However, using a disk-shaped cavity of these prescribed dimensions having the diameter as the long dimension $D=24$ meters and the height $H=1$ meter, the second and more sensitive term prevails:

$$\Delta H = 1\epsilon_0 + 43.2\epsilon_0$$
$$\Delta H = 44.2\epsilon_0$$

Consequently, in utilizing the flexing or bowing factor of Equation 1 as the predominating factor, an increase in displacement or magnification of 71% is obtained.

This invention accordingly is intended to cover strain measurements wherein the second factor of Equation 1 is predominant. From Equation 1, assuming a Poisson's ratio approaching zero:

$$\Delta H \cong H\epsilon_0 + 2D\epsilon_0$$

Consequently, for a given strain, $\epsilon_0$, the second or bowing factor, will dominate for any cavity where $D > H/2$.

It is apparent that bowing occurs in cavities with shapes other than disk shapes. In any case wherein the strain measurement is made normal to a face having a circular, square, polygonal, or other configuration which is large relative to the sides supporting that face, bowing or flexing will be significant. The optimum cavity affording maximum bowing for its volume is a disk or "open-topped" semi-disk as described above. It is obvious that other cross-sectional areas such as squares or rectangles show significant bowing. In a self-supporting medium, for instance, rock, it is only necessary to utilize half of a cavity such as a disk or (parallelepiped) since the cavity is open-topped. It is only essential according to this invention that the cavity have at least a semi-cylindrical capacity wherein the strain is measured essentially along the axis of the cylinder and wherein the diameter is greater than half the height. This is to say that the cavity may be of any shape provided, however, that its volume is sufficient to contain an imaginary semicylinder having its axis defined by the two points between which the strain is measured and having a diameter greater than half the distance between the two points. This definition insures that the displacement of the two points along the axis of the cylinder is predominantly due to flexing or bowing rather than to simple linear displacement. However, in order to further utilize the advantages of this arrangement it is preferred that the flexing or bowing factor predominates to the extent of 90%. This condition is met when the diameter is five times the height. In some instances, even greater ratios of diameter to height will be desirable. These definitions are premised on a Poisson's ratio not substantially exceeding .3 which is a practical maximum for most materials. Many modifications may be made within this definition such as utilizing an entire disk or a rectangle which has a depth equal to or greater than the diameter prescribed in the basic definition.

A further and very significant advantage in measuring strains using the cavity of this invention is that the gauge dimension is shortened by a considerable degree. Linear strain seismographs conventionally measure the displacement between the two remote points at either end of the longest dimension. In the specific apparatus previously discussed, this requires a gauge at least 24 meters in length for the described sensitivity. With such a length the careful suspension of a long rigid rod, with resultant problems of temperature variation, random mechanical oscillations, et cetera, is necessary. However, using the apparatus according to this invention, the strain is measured across the shortest dimension or in the case previously presented, one meter. This is a significant reduction in gauge requirements as it permits simpler and more reliable mounting of the deflection member.

It may be found convenient, particularly in seismic strain detection, to utilize cavities which naturally occur in the medium; however, the cavity may be purposefully formed or may take the form of a container in the desired shape, constructed, for instance, of steel and imbedded in the medium. Such an arrangement is shown in FIG. 2. The container is shown at 20. For media which are not self-supporting, a container would be essential.

While the semicylinder has been disclosed with the axial plane surface horizontally disposed, it will function properly in any position so long as the prescribed cavity dimensions are met and the axis is disposed substantially in the direction of the strain to be measured.

What is claimed is:

1. A method for measuring strains in a medium comprising fixing a strain gauge across a cavity formed in said medium, said cavity having a volume at least sufficient to contain an imaginary semicylinder in which the diameter is greater than one-half the height where one dimension of the cavity corresponds to the said height, whereby the predominant factor dictating the strain responsive displacement of the two points where the axis of the said semicylinder intersects the walls of the medium supporting the cavity is by flexing or bowing as opposed to simple linear displacement, the said strain gauge being positioned essentially between the said points on the axis, and measuring the response of the strain gauge to the relative axial displacement of said points.

2. The method of claim 1 wherein the cavity shape is a semicylinder.

3. The method of claim 1 wherein the said medium is earth and the strains measured are seismic strains.

4. The method of claim 3 wherein the cavity is a naturally occurring cavity.

5. A method for measuring strains in a medium comprising fixing a strain gauge across a cavity formed in said medium, said cavity having a volume at least sufficient to contain an imaginary semicylinder in which the diameter is at least five times the height where the minimum dimension of the cavity corresponds to the said height, whereby the predominant factor dictating the strain responsive displacement of the two points where the axis of the said semicylinder intersects the walls of the medium supporting the cavity is by flexing or bowing as opposed to simple linear displacement, the said strain gauge being positioned essentially between the said points on the axis, and measuring the response of the strain gauge to the relative axial displacement of said points.

6. The method of claim 5 wherein the cavity is formed by a self-supporting container imbedded in the medium.

7. The method of claim 5 wherein the medium is earth and the strains measured are seismic strains.

References Cited in the file of this patent

UNITED STATES PATENTS

| | | |
|---|---|---|
| 1,708,333 | Smith | Apr. 9, 1929 |
| 2,036,458 | Carlson | Apr. 7, 1936 |
| 2,036,824 | Owen | Apr. 7, 1936 |
| 2,148,013 | Carlson | Feb. 21, 1939 |
| 2,417,077 | Hoover | Mar. 11, 1947 |